July 7, 1964   W. T. SOMERVILLE   3,140,311
C₁₁ ALCOHOLS AND CORRESPONDING ACETIC ACID ESTERS
Filed March 3, 1961   4 Sheets-Sheet 1
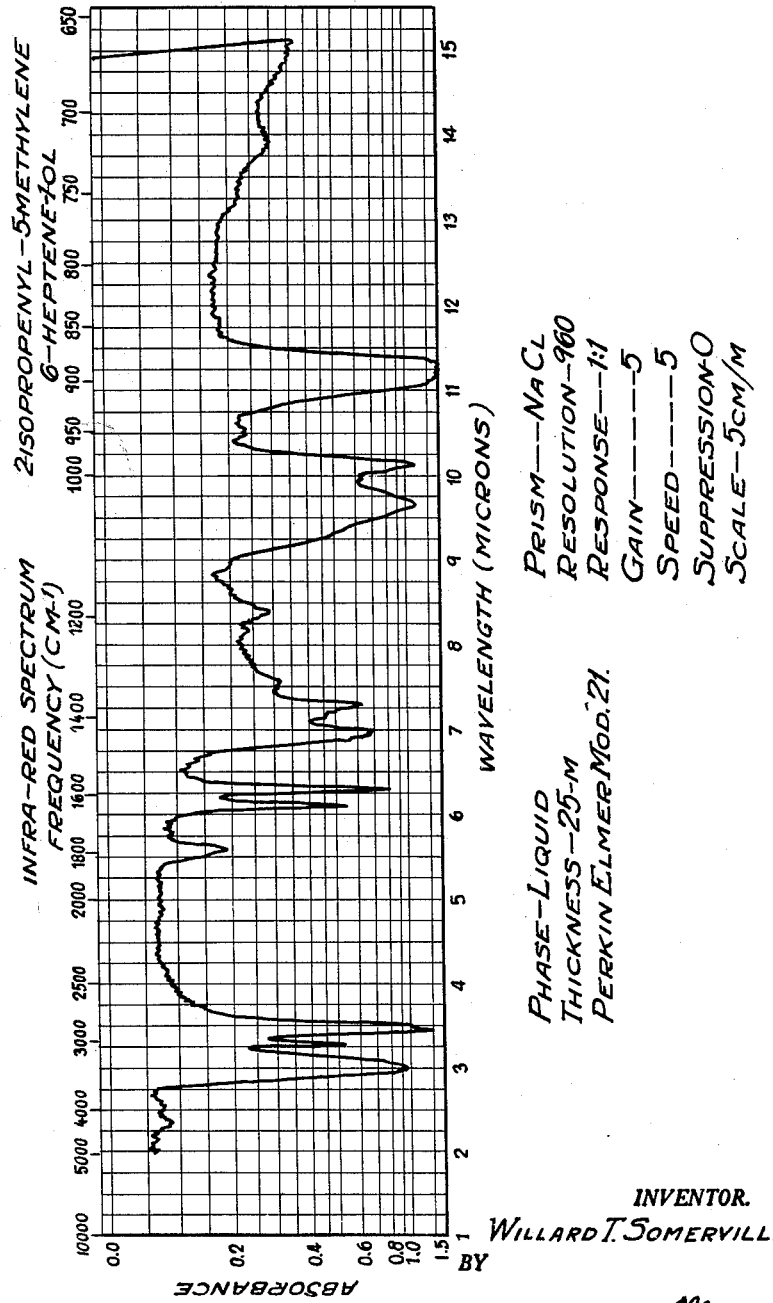
INVENTOR.
WILLARD T. SOMERVILLE.
BY
ATTORNEYS.

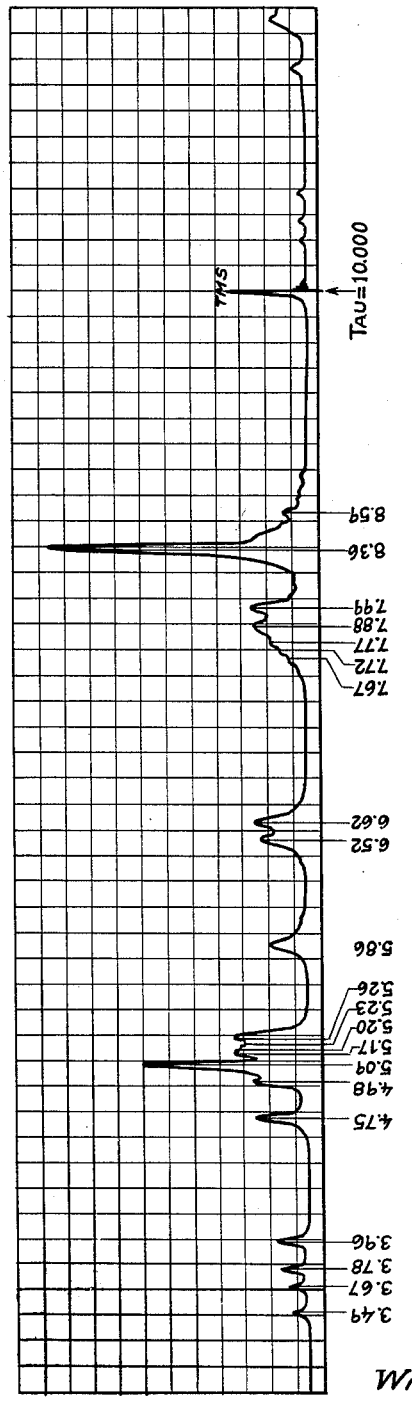

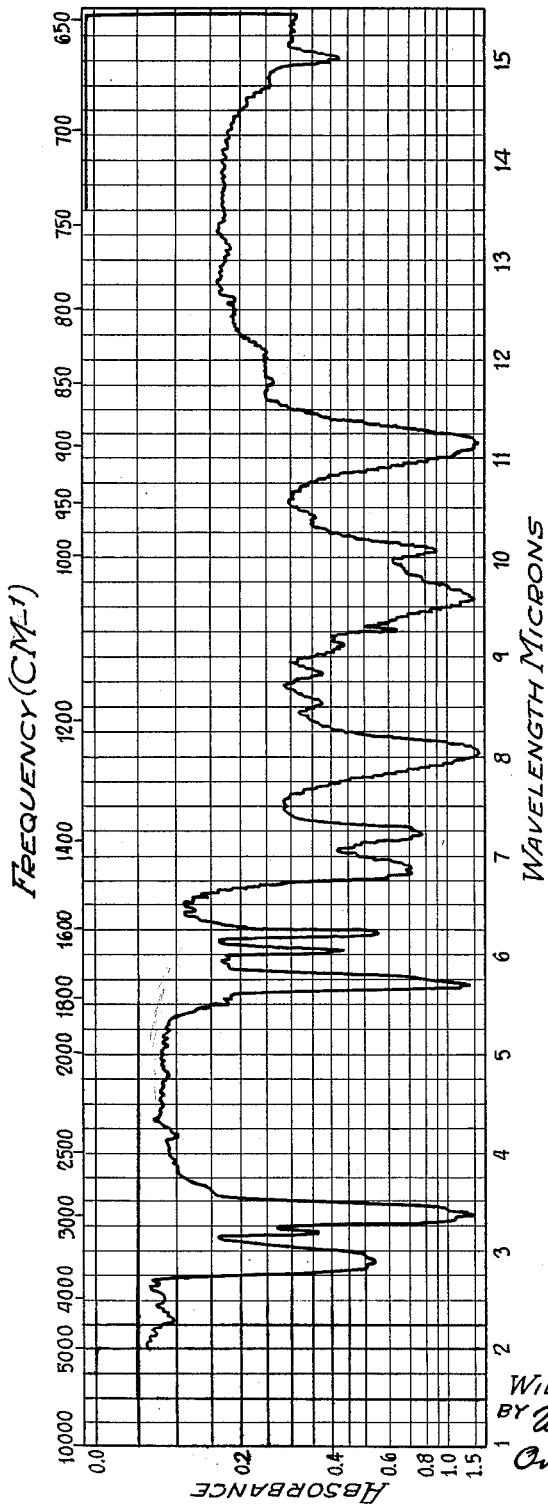

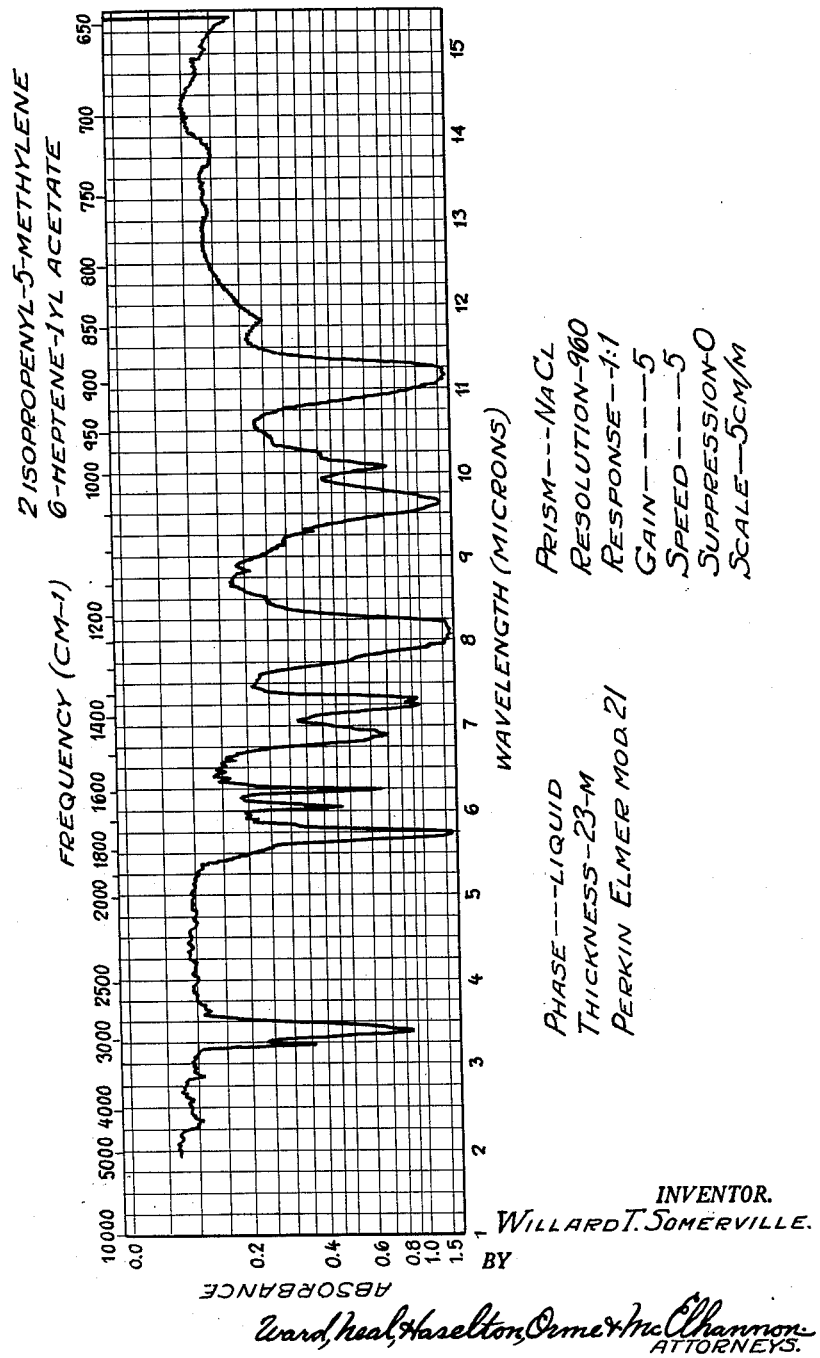

United States Patent Office 3,140,311
Patented July 7, 1964

3,140,311
C₁₁ ALCOHOLS AND CORRESPONDING ACETIC ACID ESTERS
Willard T. Somerville, Fair Haven, N.J., assignor to International Flavors & Fragrances Inc., New York, N.Y., a corporation of New York
Filed Mar. 3, 1961, Ser. No. 93,138
3 Claims. (Cl. 260—488)

This invention relates to products of formaldehyde and myrcene and processes for making same. Products made in accordance with my invention are useful as perfumes.

Myrcene has heretofore been heated with trioxymethylene, with an acid catalyst to form resins, in accordance with the patent to Rummelsburg No. 2,397,205 These resins are stated to be useful in textile finishes.

In Webb Patent 2,919,290, such production of resin by reaction of myrcene with formaldehyde and a catalyst is recognized. In col. 1, commencing line 35 of the Webb patent the following statement is made:

"These two acyclic trienes (referring to myrcene and allo-ocimene) react with formaldehyde, but their high degree of unsaturation makes them particularly susceptible to polymerization on thermal or acid treatments such as those necessary to provoke reaction of formaldehyde and terpene. Therefore it is not satisfactory to utilize such terpenes for reaction with formaldehyde to produce acyclic alcohols of eleven carbon atoms."

Webb accordingly proposed to hydrogenate myrcene, and then to react hydrogenated myrcene with formaldehyde. By hydrogenating myrcene before treatment with formaldehyde he avoided resin formation.

The principal object of the present invention, accordingly, is to produce a series of useful unpolymerized reaction products of myrcene and formaldehyde, and to provide a simple, efficient process for producing such unpolymerized products.

The invention comprises the novel products, the specific embodiments of which are described hereinafter by way of example, and in accordance with which I now prefer to practice the invention.

I have found in accordance with my invention that I can produce from myrcene, formaldehyde and a mild acid one or more compounds having the formula:

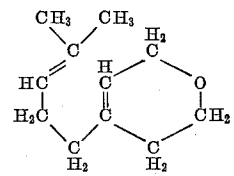

where one of the symbols R and R' is oxygen and the other is CH₂.

In other words, the formula given is for two isomers in which the —O— is at different positions on the ring at the right, as follows:

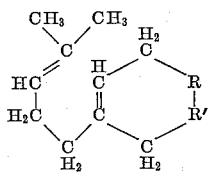

3(4-methyl-3-pentenyl) 5,6 dihydro-2H-pyran and

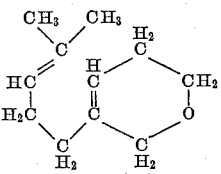

4(4-methyl-3-pentenyl) 5,6 dihydro-2H-pyran

These isomers may be present singly, or as a mixture. Hereinafter these isomers are sometimes referred to, for brevity, as methyl pentenyl dihydropyran. I have also found that the production of this methyl pentenyl dihydropyran is accompanied by the production of acyclic primary C₁₁ alcohols and their corresponding acid esters.

I have also found in accordance with my invention that I can produce these compounds by a process which comprises heating a mixture of myrcene, formaldehyde and a mild acid in proportions sufficient to react only 1 mol of formaldehyde with 1 mol of myrcene. The formaldehyde is used in the form of paraformaldehyde. Aqueous formaldehyde or a substance producing formaldehyde under the reaction conditions herein may also be used. The mild acid may be formic, acetic, trimethyl acetic or propionic acid, or equivalent. The esters formed by these acids accordingly include the formate, acetate, propionate and trimethyl acetates.

The mixture of myrcene, formaldehyde and acid is heated and refluxed for several hours. The product is then washed with water and a mild alkali, and the resulting oil is separated and distilled to recover unreacted myrcene, and thereafter from the remainder is distilled and recovered the unpolymerized reaction products above mentioned. There is also distilled and recovered a mixture of C₁₁ acyclic primary alcohols and mild acid esters thereof, which are subsequently separated from each other.

The reaction occurring is as follows:

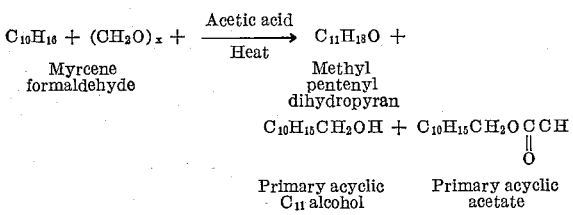

The exact amount of acids, such as glacial acetic acid, and formaldehyde used to react with a fixed amount of myrcene can be varied to some extent. Since a certain amount of higher boiling products and residue is formed in the reaction, the yield of desired products can be varied by varying the amount of acid and formaldehyde, and also the time of heating.

In this reaction it is customary to add a small amount of a preservative. The object of adding a preservative is to prevent the polymerization of the myrcene. The use of the preservative is not at all essential to the reaction, but is of some help. I commonly use Ionol, the commercial name for a preservative. It is 2,6 di-tertiary butyl para cresol. Other preservatives inert to formaldehyde may be used, namely Antioxidant 702, 4,4' methylene bis (2,6 di-tertiary butyl phenol), 2,2' methylene bis (4 methyl 6 tertiary butyl phenol), 4,4' bis (2,6 di-tertiary butyl phenol), and 4,4' methylene bis (6 tertiary butyl ortho cresol), Antioxidant 720.

The following are examples of the manner in which I now prefer to practice the invention. The examples are illustrative and the invention is not to be considered as restricted thereto except as indicated in the appended claims.

*Example 1.*—A mixture of 4080 grams of myrcene 93% (28 mols), 600 grams paraformaldehyde 91% flake (18 mols) and 1600 grams of glacial acetic acid (26 mols) are refluxed for 10 hours at atmospheric pressure. The liquid temperature is 107 to 109° C. At the end of this reflux period the material is cooled to room temperature and then poured into an equal volume of water, and washed three times with hot water and once with sodium bicarbonate solution. The separated oil was distilled over a 14″ protruded packed column to a liquid temperature of 100° C., using a vacuum of 25 mm. of mercury to recover the myrcene. The remainder of the material was distilled without a column at a vacuum of 2 to 3 mm. One half percent Ionol was added before this distillation was started, as a preservative. 1,736 grams of myrcene were recovered from the first distillation, and an additional 446 grams from the distillation without a column. A fraction of the desired material boiling between 68° C. and 148° C. at 3 to 5 mm. amounted to 1,237 grams. Higher boiling material amounted to 422 grams, and the residue was 317 grams.

The 1,237 grams of product, when redistilled using a fractionating column, yielded 510 grams of methyl pentenyl dihydropyran.

The pure methyl pentenyl dihydropyran separated from the reaction mixture by fractionation had the following physical constants:

B.P. 60–2°/3.5 mm.; 53–54°/1.9 mm.
$n_D^{20}$ 1.4810–1.4814
$D_{15}^{20}$ 0.9159–0.9165

It analyzes as C=79.15%, H=10.75%. Calculated for $C_{11}H_{18}O$: C=79.46%, H=10.91%.

Gas chromatography on this substance, even on a capillary column, shows only one peak, and thus fails to establish the presence of more than one constituent.

A nuclear magnetic resonance chart (said term "nuclear magnetic resonance" being hereinafter sometimes referred to as "NMR") is included as part of this application, and is referred to below. The nuclear magnetic resonance band for the hydrogens in the O—$CH_2$— C=C group (chemical shift Tau=5.86) shown on the magnetic resonance chart is presumed to be due to an unresolved trio of peaks, resulting from a mixture of 4(4-methyl-3-pentenyl) 5,6-2H-pyran which would give a doublet, and 3(4-methyl-3-pentenyl) 5,6 dihydro-2H-pyran, which would give a singlet. Determination of nuclear magnetic resonance was made in accordance with the disclosure thereof contained in "Applications of Nuclear Magnetic Resonance Spectroscopy," by L. M. Jackman, Pergamon Press, New York, 1959.

In addition, an alcohol-ester section of 404 grams B.P. 73–100° C./0.7–0.8 mm., $n_D^{20}$ of 1.4840–1.4950 was obtained. This fraction has a $n_D^{20}$ of 1.4908, a $D_{15}^{20}$ 0.9300, and when saponified with Normal sodium hydroxide solution required 1.80 ml. After acetylation with acetic anhydride, one gram of acetylated product required 5.50 ml. of Normal sodium hydroxide for saponification. The infrared spectrum, a drawing of which is referred to below, shows both the presence of alcohol and ester groups. This spectrum represents the mixture obtained by this example. It will vary somewhat depending on the exact composition of the mixture produced. The alcohol in the above alcohol-ester section was recovered as set forth in Example 7 below. The acetate was prepared from this alcohol in accordance with Example 8 below. The properties of both the alcohol and ester are given in said examples.

I have also found that other organic acids, besides acetic acid, can be used in this reaction. The following is an example using propionic acid:

*Example 2.*—3060 grams of myrcene, 93% purity, 900 grams of paraformaldehyde 91%, and 2960 grams of propionic acid (99% pure) were refluxed together for 10 hours. The liquid temperature was approximately 112° C. When the reflux time was over, the mixture was poured into water and the separated oil was washed several times with water and then with warm sodium bicarbonate solution until free of acid.

The unreacted myrcene was recovered by distillation at 25 mm. of vacuum to a liquid temperature of 100° C. 1306 grams myrcene were recovered. The remainder was distilled at 1 mm. to separate residue (178 grams). In this way, 1542 grams of crude product was obtained, and which was redistilled through a 15″ protruded packed column at 1 mm. to yield:

692 grams methyl pentenyl dihydropyran fraction—B.P. 63–68°/1 mm.
287 grams primary acyclic $C_{11}$ alcohol-propionate fraction—B.P. 83–121°/1 mm.
374 grams higher boiling material—B.P. 127–143°/1 mm.
88 grams residue.

*Example 3.*—Reaction of myrcene with formaldehyde in the presence of formic acid:

In a flask, fitted with a stirrer, thermometer, reflux condensers, and heating mantle, was placed:

3060 grams of myrcene (97% pure)
2000 grams of 90% formic acid
900 grams of paraformaldehyde 91% flake
30 grams of Ionol.

The mixture was refluxed for 10 hours. The liquid temperature varied between 105 and 115° C. It was then cooled and poured into water and the separated oil washed twice with hot water and once with sodium bicarbonate solution. The material was distilled from a flask without a column in an attempt to recover myrcene, as there was very little unreacted myrcene. The material was then distilled in a vacuum of 2 to 3 mm. to yield the following fractions:

B. P. 28 to 53° C., 118 grams
B.P. 53 to 67° C., 225 grams
B.P. 71 to 115° C., 1026 grams ($C_{11}$ primary acyclic alcohol-ester section)
B.P. 115 to 131° C., 513 grams (higher boiling material)
Residue, 217 grams.

The alcohol-ester section mentioned above contains 62% ester when analyzed by saponification, assuming a molecular weight of 194 for the formate. It analyzed 34.1% free alcohol by acetylation and correcting for the known ester content. The specific gravity at 20/20° was 0.9890; the index of refraction at 20° was 1.4909.

The 225 gram section, mentioned above, was carefully refractionated to obtain methyl pentenyl dihydropyran. Upon refractionation 58 grams of crude methyl pentenyl dihydropyran were obtained. This crude material was found to contain 30% of methyl pentenyl dihydropyran, by vapor phase chromatography.

Results of this experiment indicate that the reaction of myrcene and paraformaldehyde in the presence of formic acid is much more vigorous and more complete than the other acids. Very little or no myrcene is recovered unreacted. Also, the amount of methyl pentenyl dihydropyran formed is quite small, while the amount of alcohol-ester mixture is larger than with acetic acid.

*Example 4.*—Using beta pinene pyrolyzate containing about 75% of myrcene:

A mixture of—

4080 grams of beta pinene pyrolyzate
900 grams of paraformaldehyde (91%)
2400 grams of glacial acetic acid and
50 grams of Ionol was reacted and worked up as in Example 1 to give corresponding fractions. The following products were obtained:

1543 grams of recovered myrcene
525 grams methyl pentenyl dihydropyran
1053 grams of $C_{11}$ alcohol and corresponding ester fraction
382 grams higher boiling products, and
414 grams of residue.

The alcohol ester fraction boiled at 70–93° C. at 1.5 mm., and had a $D_{20}^{20}$ of 0.9584 and a refractive index at 20° of 1.4900. Upon saponification it required 1.98 ml. of Normal sodium hydroxide solution per gram of sample.

After acetylation a sample required 5.55 ml. of Normal sodium hydroxide solution to saponify 1 gram of acetylated product.

*Example 5.*—Using pivalic acid (trimethyl acetic acid):
In this example I used—

816 grams of myrcene (96%)
1224 grams of trimethyl acetic acid
240 grams of paraformaldehyde 91%, and
10 grams of Ionol.

The mixture was refluxed for 10 hours, during which time the liquid temperature varied from 115° C. at the beginning to 140° C. at the end of 10 hours. The mixture was decomposed with water and washed with very hot water, and then repeatedly washed with hot sodium bicarbonate solution until neutral. It was then vacuum distilled to yield the following products:

217 grams of recovered myrcene
56 grams methyl pentenyl dihydropyran
186 grams of $C_{11}$ alcohols and corresponding ester fractions, B.P. 116 to 142° C. at 0.7 mm., $D_{20}^{20}$ 0.8865. Index of refraction at 20°—1.4933.

1 gram of this material required 0.57 ml. of Normal sodium hydroxide solution for saponification. After acetylation 1 gram of acetylated product required 0.82 ml. of Normal sodium hydroxide solution for saponification.
153 grams of residue.

*Example 6.*—Using aqueous formaldehyde:
In this example I react a mixture of—

2040 grams of myrcene (91%)
1600 grams of glacial acetic acid, and
4425 grams of formaldehyde, aqueous solution (37%).

This mixture was refluxed and stirred for 10 hours. It was then poured into water and the oily layer separated and washed with water and sodium bicarbonate solution. The crude oil was then worked up as in Example 1 to yield:

1056 grams of recovered myrcene
23 grams of methyl pentenyl dihydropyran
175 grams of $C_{11}$ alcohols and corresponding esters, B.P. 62 to 72° C. at 1 mm. Index of refraction at 20°— 1.4869, $D_{20}^{20}$ 0.9537
227 grams of higher boiling material, and
379 grams of residue.

The alcohol-ester section when saponified was found to have an ester content equivalent to 0.12 ml. of Normal sodium hydroxide per gram. An examination of this material by infrared indicated that this material consisted principally of alcohols.

*Example 7.*—Saponification of alcohol ester mixture of Example 1:

The $C_{11}$ acyclic alcohol and corresponding ester section obtained as in Example 1, was saponified by refluxing with 10% ethyl alcoholic sodium hydroxide, followed by recovery of the ethanol, washing neutral, and distilling. In this manner $C_{11}$ alcohols were obtained which when vacuum distilled boiled at 60 to 96° C. at 0.6 mm. Upon refractionation, an alcohol, B.P. 66° at 0.25 mm. of mercury, index of refraction at 20° 1.4912, was obtained. It ultraviolet absorption curve showed a maximum at 224.5 mm., and its extinction coefficient or epsilon value was calculated as 17,000 based on a molecular weight of 166. When tested for diene content by the standard maleic anhydride procedure, it showed a diene content of 99%. By gas chromatography this material tested as being 97% pure. Examination of the NMR spectrum of said alcohol, included in the drawings accompanying this application, indicates the following features:

| Tau Value | Multiplicity | Type Protons |
|---|---|---|
| 1. 8.36 | Singlet | One $CH_3$ group |
| 2. 6.62, 6.52 | Doublet | $CH_2$—OH |
| 3. 5.86 | Singlet, Broad | O—H |
| 4. 5.17, 5.20, 5.23, 5.26 | Multiplet Unresolved | $\begin{array}{c}C\\ \diagdown\\ \phantom{x}\phantom{x}C=CH_2\\ \diagup\\ C\end{array}$ |
| 5. 4.75, 4.98, 5.09 | Multiplet | $\begin{array}{c}CH_2\\ \|\|\\ C—C—C=CH_2\\ \|\\ H\end{array}$ |
| 6. 3.49, 3.67, 3.78, 3.96 | Clearly resolved Quartet. | $\begin{array}{c}C\\ \|\\ C=C—C—H\\ \|\|\\ CH_2\end{array}$ |

NOTE.—Tau values are relative to tetramethyl silane.

In accordance with said examination and examination of the infrared spectrum, also included in the drawings herewith, the formula of the alcohol was determined to be 2-isopropenyl-5-methylene-6-heptene-1-ol, corresponding to the following structural formula:

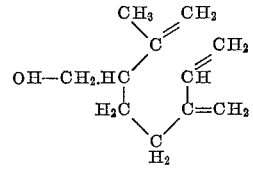

*Example 8.*—The 2-isopropenyl-5-methylene-6-heptene-1-ol prepared as described in Example 7, was acetylated by refluxing with an equal weight of acetic anhydride for three hours. The reaction mixture was then cooled, washed with warm water to destroy the excess acetic anhydride, and then washed further with water until neutral. The crude ester was then dried and vacuum distilled. It boiled at 53 to 54° C. at 0.05 mm. of mercury pressure. It had a density at 20/15° of 0.925; index of refraction $n_D^{20}$ 1.4737. Its purity was 94.5% when saponified by alcoholic sodium hydroxide and 95% by gas chromatography. Its ultraviolet curves showed a maximum at 22.5 millimicrons, and its extinction coefficient or epsilon value at this wave length was 16,570 calculated on the basis of a molecular weight of 208.3. Examination of the NMR spectrum of said alcohol, which establishes the structure of the corresponding acetate, coupled with examination of the infrared spectrum of said acetate, included in the drawings herewith, determines the formula for the acetate to be 2-isopropenyl-5-methylene-6-heptene-1-yl acetate. The structural formula thereof is:

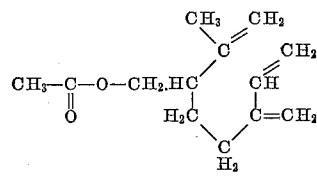

In the accompanying drawings forming part of this specification:

FIG. 1 is an infrared spectrograph of the alcohol produced by my process;

FIG. 2 is a nuclear magnetic resonance chart of the alcohol obtained by my process.

FIG. 3 is an infrared spectrograph of the mixture of $C_{11}$ alcohols and esters obtained in accordance with Example 1, and FIG. 4 is an infrared spectrograph of the acetic acid ester of the alcohol obtained by my process.

The methyl pentenyl dihydropyran is a perfume material having a strong refreshing floral odor with rose, muget, violet and limey character. It is useful in a wide range of perfumes from floral to herb-cologne blends. The $C_{11}$ alcohols are perfume materials having a very rich rose-violet note of distinctive character. The mixture of $C_{11}$ alcohols and their esters is a perfume material having an odor somewhat reminiscent of the above mentioned alcohols, but drier and more herbaceous. The $C_{11}$ alcohol designated as 2-isopropenyl-5-methylene-6-heptene-1-ol is a perfume. It has a powerful, persistent, unique and pleasant odor of pronounced violet character. The acetate of the last mentioned alcohol has a natural and individualistic odor. It is also a perfume. It has a pleasant green, plant-like, chrysanthemum- and cologne-like odor. It is useful as part of the perfumes geranium, neroli and bergamot.

This application is a continuation-in-part of my copending application Serial No. 33,444, filed June 2, 1960, now Patent No. 3,030,384. Matter not herein claimed is claimed in said copending application.

I claim:

1. The mixture of $C_{11}$ alcohols and corresponding acetic acid esters having the respective empirical formulae $C_{10}H_{15}CH_2OH$ and

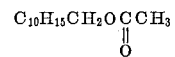

and having the infrared spectrum shown in FIG. 3, and the following physical constants:

B.P. 73–100° C. at 0.7–0.8 mm.
$n_D^{20}$ 1.4908, and
$D_{15}^{20}$ 0.9300.

2. The compound having the formula:

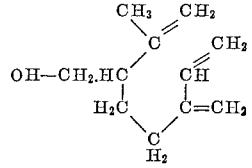

3. The compound having the formula:

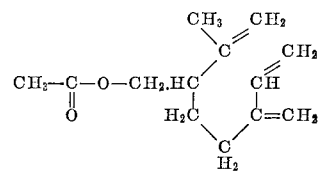

References Cited in the file of this patent

UNITED STATES PATENTS

| | | |
|---|---|---|
| 2,340,294 | Bain | Feb. 1, 1944 |
| 2,919,290 | Webb | Dec. 29, 1959 |

UNITED STATES PATENT OFFICE
CERTIFICATE OF CORRECTION

Patent No. 3,140,311            July 7, 1964

Willard T. Somerville

It is hereby certified that error appears in the above numbered patent requiring correction and that the said Letters Patent should read as corrected below.

Column 2, line 43, the formula for Primary acyclic acetate should appear as shown below instead of as in the patent:

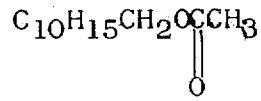

column 6, line 56, for "22.5" read -- 224.5 --.

(SEAL)        Signed and sealed this 10th day of November 1964.

Attest:

ERNEST W. SWIDER                  EDWARD J. BRENNER
Attesting Officer                   Commissioner of Patents